US012749291B2

(12) United States Patent
Lopez et al.

(10) Patent No.: US 12,749,291 B2
(45) Date of Patent: Sep. 29, 2026

(54) TECHNIQUES FOR IMAGE SEGMENTATION USING OBJECT DETECTION

(71) Applicant: THE BOEING COMPANY, Arlington, VA (US)

(72) Inventors: Esteban F. Lopez, Bridgeton, MO (US); Liessman E. Sturlaugson, St. Louis, MO (US); Peter G. Rhodes, Bridgeton, MO (US)

(73) Assignee: The Boeing Company, Arlington, VA (US)

( * ) Notice: Subject to any disclaimer, the term of this patent is extended or adjusted under 35 U.S.C. 154(b) by 126 days.

(21) Appl. No.: 18/798,504

(22) Filed: Aug. 8, 2024

(65) Prior Publication Data

US 2025/0078441 A1 Mar. 6, 2025

Related U.S. Application Data

(60) Provisional application No. 63/580,588, filed on Sep. 5, 2023.

(51) Int. Cl.
*G06V 10/764* (2022.01)
*G06T 7/11* (2017.01)
(Continued)

(52) U.S. Cl.
CPC .............. *G06V 10/764* (2022.01); *G06T 7/11* (2017.01); *G06V 10/25* (2022.01); *G06V 10/26* (2022.01); *G06V 10/7715* (2022.01); *G06V 20/70* (2022.01)

(58) Field of Classification Search
CPC ...... G06V 10/764; G06V 10/25; G06V 10/26; G06V 10/7715; G06V 20/70; G06T 7/11; G06T 2207/20081; G06T 2207/20084
See application file for complete search history.

(56) References Cited

U.S. PATENT DOCUMENTS 6,014,466 A * 1/2000 Xia ......................... G06T 9/007
375/240

FOREIGN PATENT DOCUMENTS

WO 2023128008 A1 7/2023

OTHER PUBLICATIONS

McNabb, M., “Deep Inspection Secures Patent for AI-Driven Drone Aircraft Inspection System, Aiming to Enhance Safety and Efficiency,” https://dronelife.com/2024/09/06/deep-inspection-secures-patent-for-ai-driven-drone-aircraft-inspection-system-aiming-to-enhance-safety-and-efficiency/, Sep. 6, 2024.

(Continued)

*Primary Examiner* — Stephen R Koziol
*Assistant Examiner* — Michael Kim Maiden
(74) *Attorney, Agent, or Firm* — Harrity & Harrity, LLP

(57) ABSTRACT

The present disclosure provides a method of performing image segmentation on an image. The method includes partitioning the image into a first plurality of cells, and applying an image classification model to some or all of the first plurality of cells to identify a first set of one or more cells that depict an object. The object is provided a first classification by the image classification model. The method further includes generating, for at least one cell of the first set, a respective second plurality of cells that are in the vicinity of the cell, applying the image classification model to some or all of the second plurality of cells to identify a second set of one or more cells that depict the object, and generating, using the cells of the first set and the second set that depict the object, a border around the object.

20 Claims, 6 Drawing Sheets

(51) Int. Cl.
*G06V 10/25* (2022.01)
*G06V 10/26* (2022.01)
*G06V 10/77* (2022.01)
*G06V 20/70* (2022.01)

(56) References Cited

OTHER PUBLICATIONS

Ribeiro et al., “Why Should I Trust You?”: Explaining the Predictions of Any Classifier, Conference: Proceedings of the 2016 Conference of the North American Chapter of the Association for Computational Linguistics: Demonstrations, Feb. 2016.
U.S. Appl. No. 18/825,757, entitled “Mode-Selectable Computer Vision Using Image Classifier Model”, filed Sep. 5, 2024.
U.S. Appl. No. 18/617,432, entitled “Region-Based Object Detection With Contextual Information”, filed Mar. 26, 2024.

* cited by examiner

TECHNIQUES FOR IMAGE SEGMENTATION USING OBJECT DETECTION

CROSS-REFERENCE TO RELATED APPLICATIONS

This application claims benefit of U.S. provisional patent application Ser. No. 63/580,588, filed Sep. 5, 2023, which is incorporated herein by reference in its entirety.

FIELD

Aspects of the present disclosure relate to computer vision, and more specifically, techniques for performing image segmentation on an image using an object detection model.

BACKGROUND

Object detection is a fundamental function in computer vision that involves identifying and locating objects depicted in an image or a video sequence. Object detection models are typically provided with a portion of an image (sometimes termed as a "crop" or a "cell"), and the object detection models perform image classification and object localization functions on the portion. A typical output of object detection models includes one or more bounding boxes around the detected object(s), as well as class labels describing the detected object(s). Object detection is used in various applications, such as autonomous vehicles, security services, image recognition, and augmented reality.

Image segmentation is another computer vision function that involves dividing an image into multiple segments (e.g., groups of pixels) to simplify or change the representation of the image into something more meaningful and easier to analyze. Some example types of image segmentation include semantic segmentation (where each pixel of the image is assigned a particular class label) and instance segmentation (where different instances of the same class are segmented separately).

SUMMARY

The present disclosure provides a method of performing image segmentation on an image in one aspect, the method including partitioning the image into a first plurality of cells, and applying an image classification model to some or all of the first plurality of cells to identify a first set of one or more cells that depict an object. The object is provided a first classification by the image classification model. The method further includes generating, for at least one cell of the first set, a respective second plurality of cells that are in the vicinity of the cell, applying the image classification model to some or all of the second plurality of cells to identify a second set of one or more cells that depict the object, and generating, using the cells of the first set and the second set that depict the object, a border around the object.

In one aspect, in combination with any example method above or below, the first plurality of cells are non-overlapping with each other.

In one aspect, in combination with any example method above or below, for at least one cell of the one or more cells, some or all of the second plurality of cells partly overlap with the cell.

In one aspect, in combination with any example method above or below, for at least one cell of the second set, the object is provided a second classification by the image classification model.

In one aspect, in combination with any example method above or below, the method further includes determining a final classification for the object based on respective confidence levels for the classifications of the cells of the first set and the second set. Generating the border around the object is responsive to determining the final classification.

In one aspect, in combination with any example method above or below, a cell size of the second plurality of cells is smaller than a cell size of the one or more cells.

In one aspect, in combination with any example method above or below, partitioning the image is responsive to applying the image classification model to the image.

In one aspect, in combination with any example method above or below, generating the border around the object is responsive to one of: determining an intersection of the cells of the first set and the second set, and determining midpoints of the cells of the first set and the second set.

The present disclosure provides a computer program product in one aspect, the computer program product including: a computer-readable storage medium having computer-readable program code embodied therewith, the computer-readable program code executable by one or more computer processors to perform an operation of image segmentation on an image. The operation includes partitioning the image into a first plurality of cells, and applying an image classification model to some or all of the first plurality of cells to identify a first set of one or more cells that depict an object. The object is provided a first classification by the image classification model. The operation further includes generating, for at least one cell of the first set, a respective second plurality of cells that are in the vicinity of the cell, applying the image classification model to some or all of the second plurality of cells to identify a second set of one or more cells that depict the object, and generating, using the cells of the first set and the second set that depict the object, a border around the object.

In one aspect, in combination with any example computer program product above or below, the first plurality of cells are non-overlapping with each other.

In one aspect, in combination with any example computer program product above or below, for at least one cell of the one or more cells, some or all of the second plurality of cells partly overlap with the cell.

In one aspect, in combination with any example computer program product above or below, for at least one cell of the second set, the object is provided a second classification by the image classification model.

In one aspect, in combination with any example computer program product above or below, the operation further includes: determining a final classification for the object based on respective confidence levels for the classifications of the cells of the first set and the second set. Generating the border around the object is responsive to determining the final classification.

In one aspect, in combination with any example computer program product above or below, a cell size of the second plurality of cells is smaller than a cell size of the one or more cells.

In one aspect, in combination with any example computer program product above or below, partitioning the image is responsive to applying the image classification model to the image.

In one aspect, in combination with any example computer program product above or below, generating the border around the object is responsive to one of: determining an intersection of the cells of the first set and the second set, and determining midpoints of the cells of the first set and the second set.

The present disclosure provides a system in one aspect, the system including a memory storing an image classification model, and one or more processors configured to perform an operation of image segmentation on an image. The operation includes partitioning the image into a first plurality of cells, and applying an image classification model to some or all of the first plurality of cells to identify a first set of one or more cells that depict an object. The object is provided a first classification by the image classification model. The operation further includes generating, for at least one cell of the first set, a respective second plurality of cells that are in the vicinity of the cell, applying the image classification model to some or all of the second plurality of cells to identify a second set of one or more cells that depict the object, and generating, using the cells of the first set and the second set that depict the object, a border around the object.

In one aspect, in combination with any example system above or below, for at least one cell of the second set, the object is provided a second classification by the image classification model. The operation further includes determining a final classification for the object based on respective confidence levels for the classifications of the cells of the first set and the second set. Generating the border around the object is responsive to determining the final classification.

In one aspect, in combination with any example system above or below, a cell size of the second plurality of cells is smaller than a cell size of the one or more cells.

In one aspect, in combination with any example system above or below, generating the border around the object is responsive to one of: determining an intersection of the cells of the first set and the second set, and determining midpoints of the cells of the first set and the second set.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Existing instance segmentation solutions tend to be complex, relying on an image segmentation model to first identify similar pixels in an image, followed by an image classification model to identify what the image segment represents. This approach can be computationally expensive depending on the image segmentation method used, and typically requires users to create or determine an image segmentation model that functions well with the image classification model.

The present disclosure provides techniques for performing image segmentation using image classification techniques. Using these techniques, any object detection algorithm having an extractable image classification model can be adapted to perform image segmentation. The object detection algorithm may be constrained to use a uniform grid size, or may use different grid sizes.

In some aspects, an object detection algorithm selectively crops around one or more areas of interest in an image (also called "crops" or "cells"), and uses an image classification model to classify the cells. The relative positioning and the classifications of the cells is then used to generate borders around one or more objects. In some aspects, the techniques may be used to identify false positives that are generated by the image classification model for one or more cells.

The techniques can provide substantial time and cost savings. An object detection algorithm, in some cases already selected and/or deployed by a user, may be adapted for image segmentation without requiring significant architectural changes. As the image classification model of the object detection algorithm is used to approximate the result of an image segmentation algorithm, there are no new models to be implemented and trained (or retrained) in order to implement the image segmentation functionality.

Figure 1:
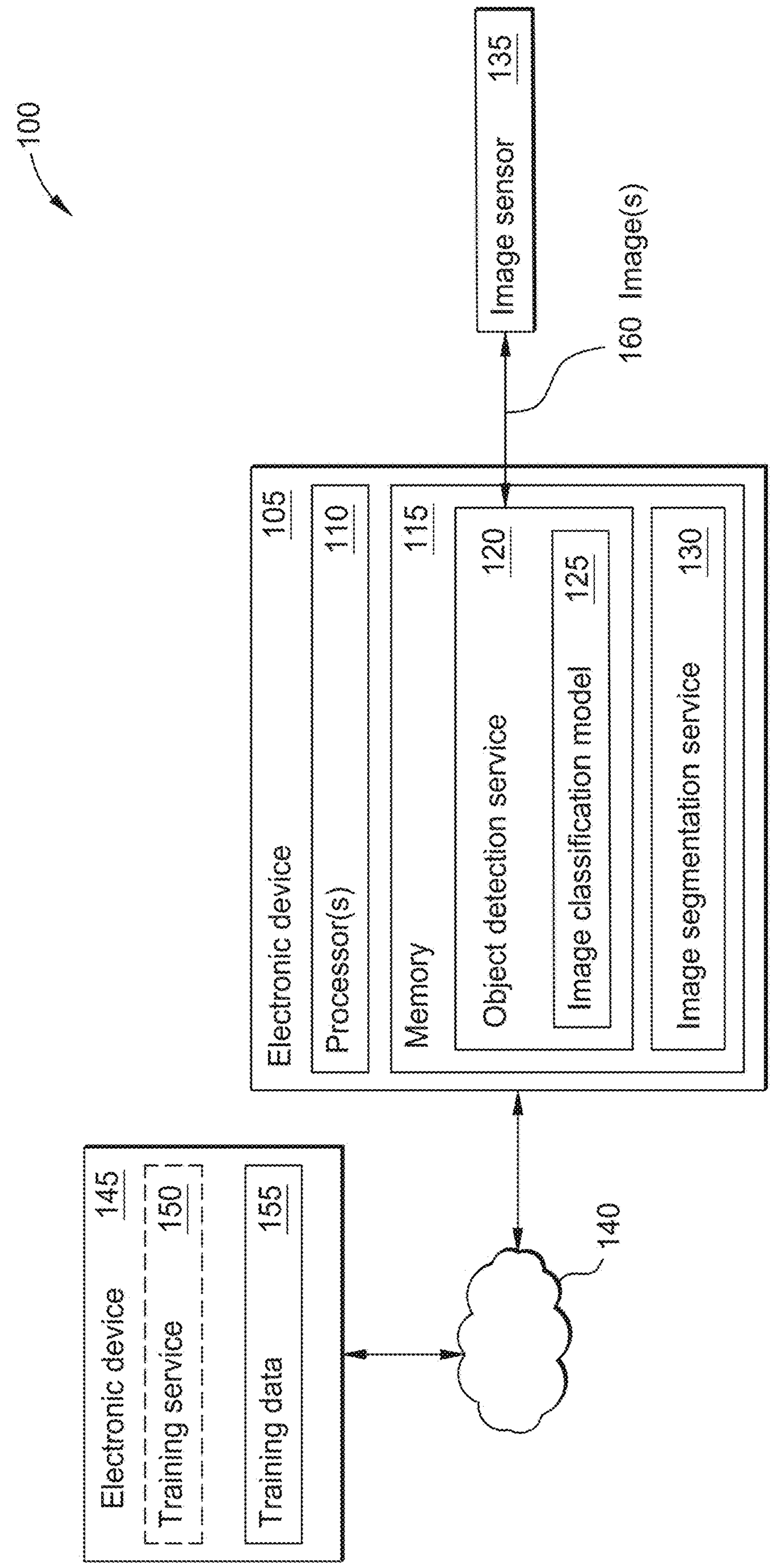
FIG. 1 depicts an example system for image segmentation using object detection techniques, according to one or more aspects.

FIG. 1 depicts an example system 100 for image segmentation using object detection techniques, according to one or more aspects. The features of the system 100 may be used in conjunction with other aspects.

The system 100 comprises an electronic device 105 that is communicatively coupled with an image sensor 135. As used herein, an "electronic device" generally refers to any device having electronic circuitry that provides a processing or computing capability, and that implements logic and/or executes program code to perform various operations that collectively define the functionality of the electronic device. The functionality of the electronic device includes a communicative capability with one or more other electronic devices, e.g., when connected to a same network. An electronic device may be implemented with any suitable form factor, whether relatively static in nature (e.g., mainframe, computer terminal, server, kiosk, workstation) or mobile (e.g., laptop computer, tablet, handheld, smart phone, wearable device). The communicative capability between electronic devices may be achieved using any suitable techniques, such as conductive cabling, wireless transmission, optical transmission, and so forth. Further, although described as being performed by a single electronic device, in other aspects, the functionalities of the system 100 may be performed by a plurality of electronic devices.

The electronic device 105 comprises one or more processors 110 and a memory 115. The one or more processors 110 are any electronic circuitry, including, but not limited to one or a combination of microprocessors, microcontrollers, application-specific integrated circuits (ASIC), application-specific instruction set processors (ASIP), and/or state machines, that is communicatively coupled to the memory 115 and controls the operation of the system 100. The one or more processors 110 are not limited to a single processing device and may encompass multiple processing devices.

The one or more processors 110 may include other hardware that operates software to control and process information. In some aspects, the one or more processors 110 execute software stored in the memory 115 to perform any of the functions described herein. The one or more processors 110 control the operation and administration of the electronic device 105 by processing information (e.g., information received from input devices and/or communicatively coupled electronic devices).

The memory 115 may store, either permanently or temporarily, data, operational software, or other information for the one or more processors 110. The memory 115 may include any one or a combination of volatile or non-volatile local or remote devices suitable for storing information. For example, the memory 115 may include random-access memory (RAM), read-only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 115, a disk, a CD, or a flash drive. In particular embodiments, the software may include an application executable by the one or more processors 110 to perform one or more of the functions described herein.

In this example, the memory 115 stores an object detection service 120 and an image segmentation service 130. The object detection service 120 receives one or more images 160 from the image sensor 135, and identifies and classifies one or more objects depicted within the one or more images 160. The image sensor 135 may have any suitable implementation, such as a visible light sensor (e.g., an RGB camera) or an infrared (IR) light sensor. Other aspects of the image sensor 135 may use non-destructive inspection techniques to generate the one or more images 160, such as shearography. The one or more images 160 may be provided in any suitable format, such as individual images or a sequence of images (e.g., video).

The object detection service 120 may be implemented with any suitable architecture, such as Faster R-CNN, Single-Shot MultiBox Detector (SSD), and You Only Look Once (YOLO). In some aspects, the object detection service 120 implements an object detection algorithm that includes an extractable image classification model 125, which may be adapted by the image segmentation service 130 to perform image segmentation according to various techniques herein. In alternate aspects, the image classification model 125 may be implemented independent of the object detection service 120.

In some aspects, the object detection algorithm implemented by the object detection service 120 is Hierarchical Models for Anomaly Detection (HMAD). In general terms, HMAD is an object detection algorithm that breaks an image into one or more crops at varying resolutions. Information from analysis of the one or more crops is combined to provide a better classification of the image and/or the one or more crops. In some aspects, the image segmentation service 130 is compatible with a lowest-level model of HMAD. Here, the "lowest-level model" represents a scenario in which the image(s) 160 are heavily subdivided into a plurality of crops in a grid pattern such that no pixels of the image(s) 160 are compressed or combined. Each of the plurality of crops is fed to the neural network of the image classification model 125 for classification. The classifications of the plurality of crops provides locations of any objects depicted in the image(s) 160. (e.g., the object detection function).

In one aspect, HMAD comprises: training a computational model to identify anomalous portions of a test component using training images and labels that indicate anomalous portions of training components within the training images; compressing a source image of the test component to generate a first input image having a first resolution; making a first determination, via the computational model, of whether the first input image indicates that the test component is anomalous; making a second determination, via the computational model and for each section of a plurality of sections of a second input image, of whether the section indicates that the test component is anomalous, wherein the second input image has a second resolution that is greater than the first resolution; providing, via a user interface, a first indication of whether the first input image indicates that the test component is anomalous; and providing, via the user interface, a second indication of whether the second input image indicates that the test component is anomalous.

The object detection service 120 may perform a number of different operations using the received one or more images 160. In some aspects, the object detection service 120 performs preprocessing of the one or more images 160 to enhance features, reduce noise, and/or standardize the input for the detection model. For example, the object detection service 120 may perform one or more of resizing, normalization, and color space conversion of the one or more images 160.

In some aspects, the object detection service 120 generates a plurality of crops (or cells) from the one or more images 160. The crops may have any suitable sizing, e.g., 224×224 pixels. In some aspects, the object detection service 120 systematically progresses across (e.g., sweeps across) an individual image of the one or more images 160 to generate a plurality of crops for the image. Other techniques for selecting regions to generate a plurality of crops are also contemplated. The crops may or may not be partially overlapping with each other. In some aspects, the object detection service 120 may perform multiple passes of an individual image to generate pluralities of crops of different sizes.

In some aspects, the object detection service 120 comprises one or more feature extractors, which may employ a corresponding one or more Convolutional Neural Networks (CNNs). The CNN(s) learn hierarchical representations of an input image (e.g., a crop or the entire image), capturing features of the input image at different levels of abstraction. Deeper layers of the CNN tend to capture high-level semantic features, while shallower layers of the CNN tend to capture low-level features like edges and textures. Other architectures of the feature extractor(s) are also contemplated, such as neural networks using self-attention layers, capsule networks, dynamic convolutional networks, transformer networks, and spatial transformer networks.

In some aspects, the object detection service 120 comprises a Region Proposal Network (RPN) that proposes candidate regions in the image that are likely to depict objects. The object detection service 120 may further perform Region of Interest (RoI) pooling to transform the candidate regions into fixed-size feature vectors (or "feature maps"), enabling the object detection service 120 to process candidate regions that have different sizes and/or shapes.

In some aspects, the image classification model 125 comprises a classifier determines the class of the object depicted within the candidate region. The classifier may have any suitable implementation, e.g., a neural network comprising a plurality of fully-connected layers and a softmax classification layer, a decision tree classifier, a support vector machine, a Bayesian network, or an ensemble model. Other aspects of the classifier are also contemplated, e.g., other types of feedforward neural networks. In some aspects, the image classification model 125 further comprises a regressor that refines the bounding box coordinates to precisely localize the object. In some aspects, the object detection service 120 applies Non-Maximum Suppression (NMS) to suppress redundant detections (e.g., overlapping bounding boxes) and/or low-confidence detections.

In some aspects, the object detection service 120 performs one or more post-processing operations, such as converting the bounding boxes and class probabilities into different formats. For example, the object detection service 120 may filter out those object detections that are below a predefined confidence threshold, and/or map class indices to human-readable labels.

In some aspects, the object detection service 120 performs the training of the feature extractor(s) and/or the image classification model 125, e.g., using a set of training data 155. The training data 155 is generally provided with a similar form as the operational data, e.g., (portions of) a plurality of images. As shown, the training data 155 is stored on an electronic device 145 that is separate from the electronic device 105. In some aspects, the electronic device 105 and the electronic device 145 are communicatively coupled through a network 140 (e.g., one or more local area networks (LANs) and/or a wide area network (WAN)). In other aspects, the training data 155 is stored in the memory 115 of the electronic device 105.

In other aspects, the electronic device 145 comprises a training service 150 that performs the training of the feature extractor(s) using the training data 155. Once trained, the parameters (e.g., model weights) of the feature extractor(s) may be frozen. In some aspects, the pretrained fixed parameters of the feature extractor(s) are provided to the object detection service 120. The object detection service 120 performs the training of the image classification model 125 using the pretrained fixed parameters. For example, self-supervised pre-training is done with the training data 155 without the image classification model 125. Then, a supervised fine-tuning is performed with some or all of the training data 155, but with the training done with the image classification model 125 in the loop against the labeled version of the training data 155.

Figure 4:
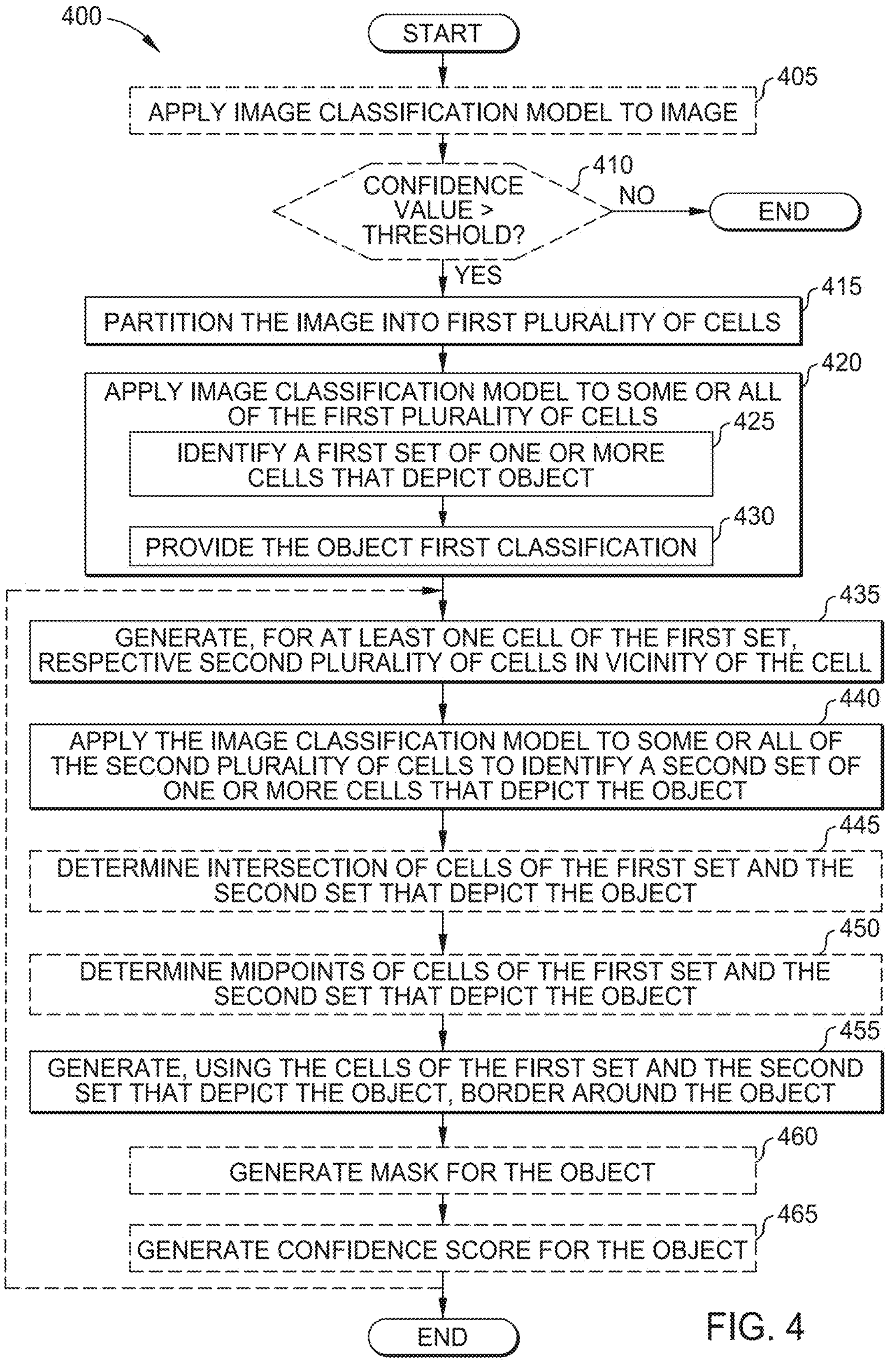
FIG. 4 is an example method of image segmentation, according to one or more aspects.

Turn ahead to FIG. 4, which is an example method 400 of image segmentation, according to one or more aspects. The method 400 may be performed in conjunction with other aspects, e.g., performed using the image segmentation service 130 and the image classification model 125 of FIG. 1.

The method 400 will now be described with reference to FIGS. 2A-2C, which depict an example sequence of image segmentation using same-size cells, according to one or more aspects. The method 400 begins at optional block 405, where an image classification model 125 is applied to an image. As shown, the image 200 depicts a background 205 and a cat 220 in the foreground. In the optional block 405, the image classification model 125 is applied to the image 200 to determine whether an object (e.g., the cat 220) is depicted therein. At the optional block 410, if the image classification model 125 determines, with a confidence value greater than a threshold value, that the object is depicted therein ("YES"), the method 400 proceeds to block 415. If the image classification model 125 determines that there is no object depicted within the image 200, or with a confidence value less than the threshold value ("NO"), the method 400 instead ends.

At block 415, the image segmentation service 130 partitions the image 200 into a first plurality of cells. The first plurality of cells may have any suitable characteristics: same-size or different size cells, rectangular or non-rectangular shapes, partly overlapping each other or non-overlapping, full or partial coverage of the image 200, and so forth. In one aspect, the first plurality of cells is partitioned according to a lowest-level model of HMAD, where the first plurality of cells is arranged in a grid pattern such that no pixels of the image 200 are compressed or combined.

At block 420, the image segmentation service 130 applies the image classification model 125 to some or all of the first plurality of cells. In some aspects, applying the image classification model 125 comprises (at block 425) identifying a first set of one or more cells that depict the object, and (at block 430) providing the object with a first classification. Providing the first classification may be performed according to any suitable techniques, such as selecting the classification for a particular cell that has a maximum confidence, majority voting among the classifications of the first set, weighted voting, and so forth. In some aspects, the image classification model 125 is a binary classifier that returns an affirmative result for a cell (indicating the cell depicts the object of interest) or a negative result for the cell (indicating the cell does not depict the object). In some aspects, the image classification model 125 is a multiclass classifier that returns the class for the cell or a "background" result where the cell does not depict an object of a predefined class.

At block 435, the image segmentation service 130 generates, for at least one cell of the first set, a respective second plurality of cells in the vicinity of the cell. In one aspect, the image segmentation service 130 generates the respective second plurality of cells for each of the cells of the first set. In another aspect, the image segmentation service 130 generates the respective second plurality of cells for those cells of the first set selected based on the respective confidence values, e.g., cells with a confidence value greater than a lower threshold value, lower than an upper threshold value, within a range of threshold values, and so forth. For example, in FIG. 2A, a cell 210 depicting an ear 215 of the cat 220 may have a confidence value greater than a threshold value, and the image segmentation service 130 generates the cells 225-1, 225-2, 225-3, 225-4 that are partly overlapping with the cell 210.

As used herein, the "vicinity" of a particular cell indicates the proximity of each cell of the respective second plurality of cells to the cell, whether partly overlapping or non-overlapping with the cell or with each other. In one aspect, a second cell is in the vicinity of a first cell when the distance between nearest edges of the first cell and of the second cell is less than a diameter of the first cell. Other measures for the vicinity determination are also contemplated, such as partly overlapping cells, adjacent cells, a distance measured between points of the cells (e.g., midpoints), and so forth. In some cases, the vicinity determination may depend on the relative sizes of the cells.

In some aspects, generating the respective second plurality of cells comprises defining an initial value of stride length, which in some cases may be based on the size of the cell. For example, the initial value may be defined as half of the diameter (or other dimension) of the cell (e.g., an initial value of 112 pixels for a cell of 224×224 pixels). In some aspects, generating the respective second plurality of cells comprises generating a plurality of cells that are arranged (or extend) one stride length away from the midpoint of the cell. In some aspects, the plurality of cells comprises four (4) or more cells. For example, as shown in FIG. 2B, each of the cells 225-1, 225-2, 225-3, 225-4 are one stride length away from the midpoint 230 in a first (e.g., horizontal) dimension, and are one stride length away from the midpoint 230 in a second (e.g., vertical) dimension. In other aspects, the cells 225-1, 225-2, 225-3, 225-4 may be one stride length away from the midpoint 230 in only one dimension.

At block 440, the image segmentation service 130 applies the image classification model 125 to some or all of the second plurality of cells 225-1, 225-2, 225-3, 225-4 to identify a second set of one or more cells that depict the object. As shown, the second set includes the cells 225-2, 225-3.

At optional block 445, the image segmentation service 130 determines an intersection of the cells of the first set and the second set that depict the object. At optional block 450, the image segmentation service 130 determines midpoints of the cells of the first set and the second set that depict the object. At block 455, the image segmentation service 130 generates, using the cells of the first set and the second set that depict the object, a border around the object. In some aspects, the image segmentation service 130 generates the border around the object responsive to the determined intersection and/or the midpoints. The border may be generated according to any suitable techniques. In one example, the border is generated between adjacent cells (whether the cells are arranged side-by-side, partly overlapping, or non-overlapping) that have different classifications.

At optional block 460, the image segmentation service 130 generates a mask for the object based on the generated border. At optional block 465, the image segmentation service 130 generates a confidence score for the object. In some aspects, although not shown, the method 400 may return to block 435 (e.g., from the optional block 465) when the confidence score for the object is less than a threshold value, and the image segmentation service 130 may generate a respective next (e.g., third) plurality of cells 235-1, 235-2, 235-3, 235-4 for at least one cell 225-3 of the second set. In some alternate aspects, generating the confidence score may be performed before generating the border around the object at block 455.

In some aspects, generating the respective next plurality of cells comprises updating the value of the stride length, e.g., reducing the current value (e.g., initial value) by a factor of two (2). While incrementally reducing the value of the stride length by two corresponds to a binary search technique, other techniques for updating the value of the stride length are also contemplated. As shown in FIG. 2C, each of the cells 235-1, 235-2, 235-3, 235-4 are one stride length away from a midpoint 240 in a first (e.g., horizontal) dimension, and are one stride length away from the midpoint 240 in a second (e.g., vertical) dimension. In other aspects, the cells 235-1, 235-2, 235-3, 235-4 may be one stride length away from the midpoint 240 in only one dimension. In some other aspects, the value of the stride length may remain unchanged (i.e., not updated), such that the cells 235-1, 235-2, 235-3, 235-4 may be one stride length away from a midpoint 245.

The method 400 may proceed through block 440, optional blocks 445, 450, block 455, and optional blocks 460, 465. Assuming that the confidence score for the object at block 465 is greater than the threshold, the method 400 ends. In some alternate aspects, the method 400 returns to block 435 until a predetermined number of recursions has been performed. In some alternate aspects, the method 400 returns to block 435 until a desired resolution of the object has been reached. In some alternate aspects, the method 400 returns to block 435 until the value of the stride length reaches a lower threshold value.

Figure 3A:
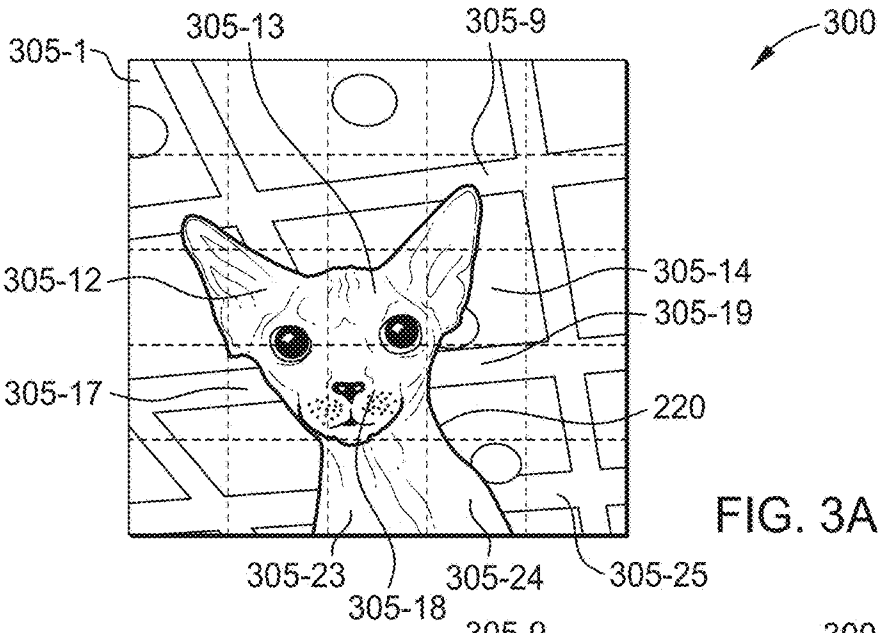
FIGS. 3A-3C depict an example sequence of image segmentation using gradually smaller cells, according to one or more aspects.
Figure 3B:
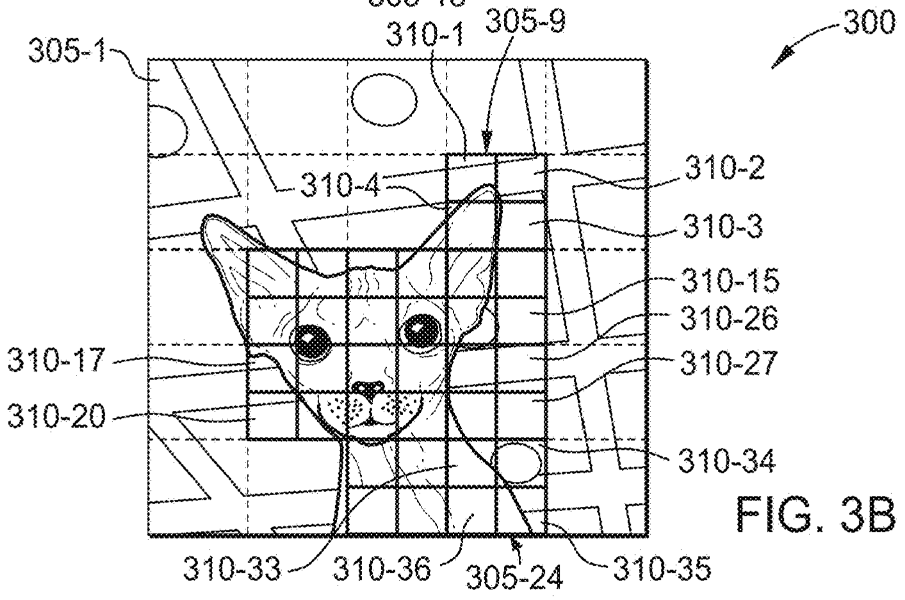
Figure 3C:
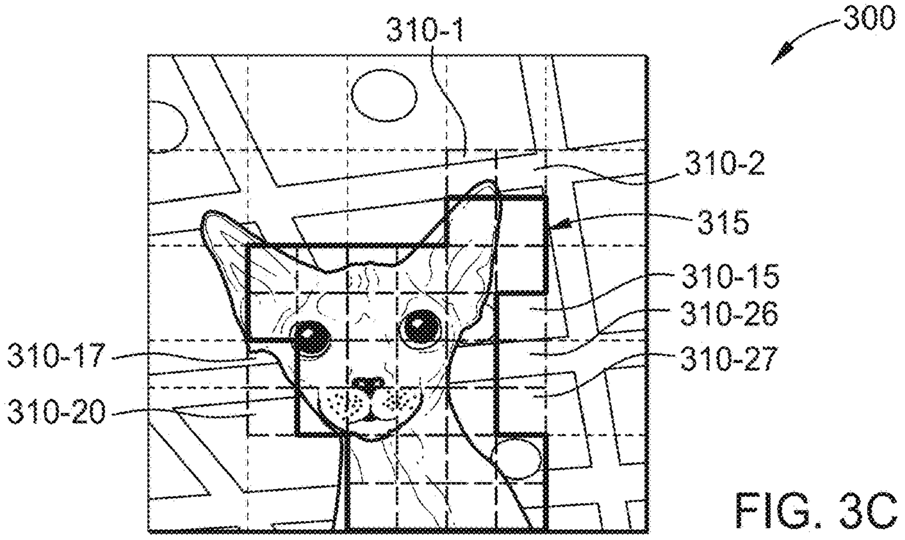

The method 400 will now be described with reference to FIGS. 3A-3C, which depict an example sequence of image segmentation using gradually smaller cells, according to one or more aspects. Although each block of the method 400 is not repeated here, the blocks may be assumed to have the same functionality as described above.

Figure 2A:
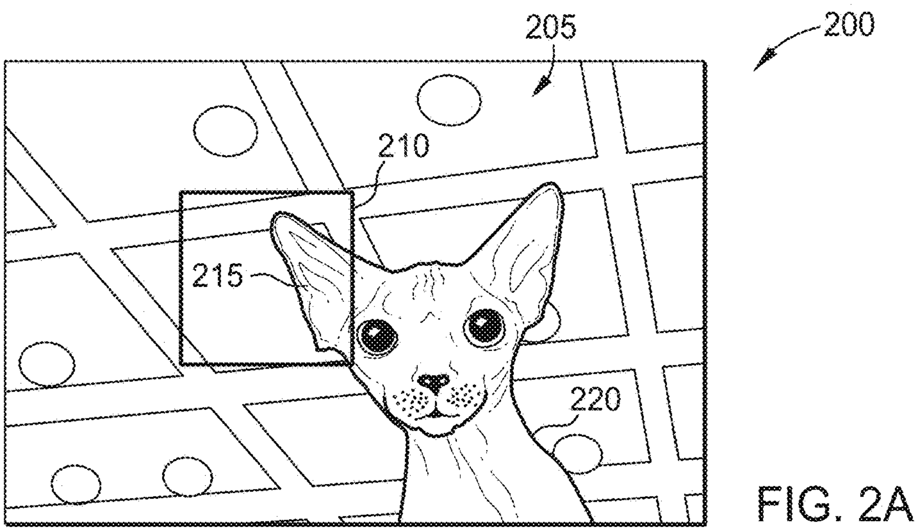
FIGS. 2A-2C depict an example sequence of image segmentation using same-size cells, according to one or more aspects.
Figure 2B:
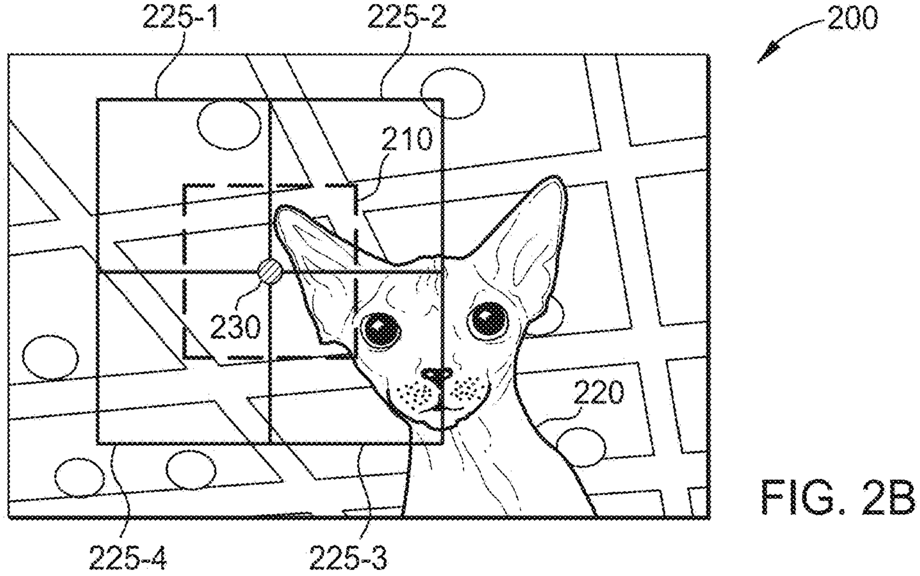
Figure 2C:
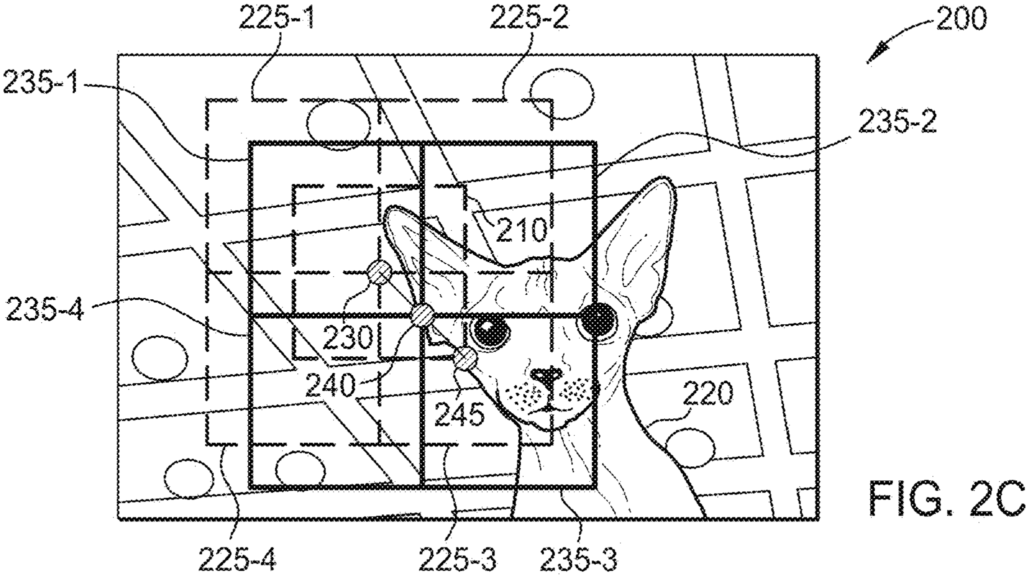

An image 300 depicts the cat 220 and generally corresponds to the image 200 of FIGS. 2A-2C. At block 415, the image segmentation service 130 partitions the image 300 into twenty-five (25) cells 305-1, . . . , 305-25 that are arranged as a 5×5 grid. At block 420, the image segmentation service 130 applies the image classification model 125 to some or all of the first plurality of cells 305-1, . . . , 305-25. At block 425, the image classification model 125 identifies the cells 305-9, 305-12, 305-13, 305-14, 305-17, 305-18, 305-19, 305-23, and 305-24 as the first set of cells depicting the cat 220. While small portions of the cat 220 are depicted in other cells of the image 300, these cells may be assumed to have a confidence value too small to be included in the first set.

At block 435, the image segmentation service 130 generates, for each cell 305-9, 305-12, 305-13, 305-14, 305-17, 305-18, 305-19, 305-23, and 305-24 of the first set, a respective second plurality of cells in vicinity of the cell. In some aspects, each cell 305-9, 305-12, 305-13, 305-14, 305-17, 305-18, 305-19, 305-23, and 305-24 is further subdivided to generate the respective second plurality of cells. For example, the cell 305-9 is subdivided into a respective second plurality of cells 310-1, . . . , 310-4, and the cell 305-24 is subdivided into a respective second plurality of cells 310-33, . . . , 310-36. Stated another way, the respective second plurality of cells may be bounded by the corresponding cell from the first set. Different numbers and/or arrangements of the second plurality of cells are also contemplated.

At block 440, the image segmentation service 130 applies the image classification model 125 to the second plurality of cells 310-1, . . . 310-36 to identify the cells of the second set. As shown, all of the second plurality of cells 310-1, . . . 310-36 except for the cells 310-1, 310-2, 310-15, 310-17, 310-20, 310-26, 310-27 are included in the second set. At block 445, the image segmentation service 130 generates a border 315 around the object using the cells of the first set and the second set. The method 400 may continue through the optional blocks 460, 465 and/or may return to block 435 to further subdivide the cells of the second set. The method 400 may continue until the confidence score for the object (block 465) is greater than the threshold, until a predetermined number of recursions has been performed, until a desired resolution of the object has been reached, and so forth.

Thus, using the method 400, the image segmentation service 130 operates the image classification model 125 to provide an approximation of image segmentation (or improved object detection). The image classification model 125 is focused on sub-sections of interest in an image to efficiently and recursively explore objects depicted in an image leading to improved object detection.

The image segmentation service 130 generates borders around depicted objects using the classifications of the cells. In this way, the image segmentation service 130 need not rely on predetermined image labels that form precise polygonal boundaries around the objects, which obviates the computing requirements and/or image modifications that may be used by conventional image segmentation techniques. The image segmentation service 130 enables the tasks of data labeling and annotation, conventionally an extraordinarily expensive task requiring outsourcing to complete in a cost-effective manner, to be performed using a grid overlaid on an image. In some cases, this approach can decrease the time required for data preparation by a factor of five (5) or more.

In some aspects, the generated border can be used to estimate an area (e.g., number of pixels) that is occupied by the object(s) depicted within the image. This area can be used to estimate the actual sizes of the object(s).

In some aspects, the image segmentation service 130 can reduce false positives occurring in the image classification model's 125 predictions during object detection by translating the classification window and recalculating the model's classification confidence. This reduces the likelihood of false positives which occur due to noise in particular sections of an image, object orientation and/or position, and background objects which affect the model's classification.

Figure 6:
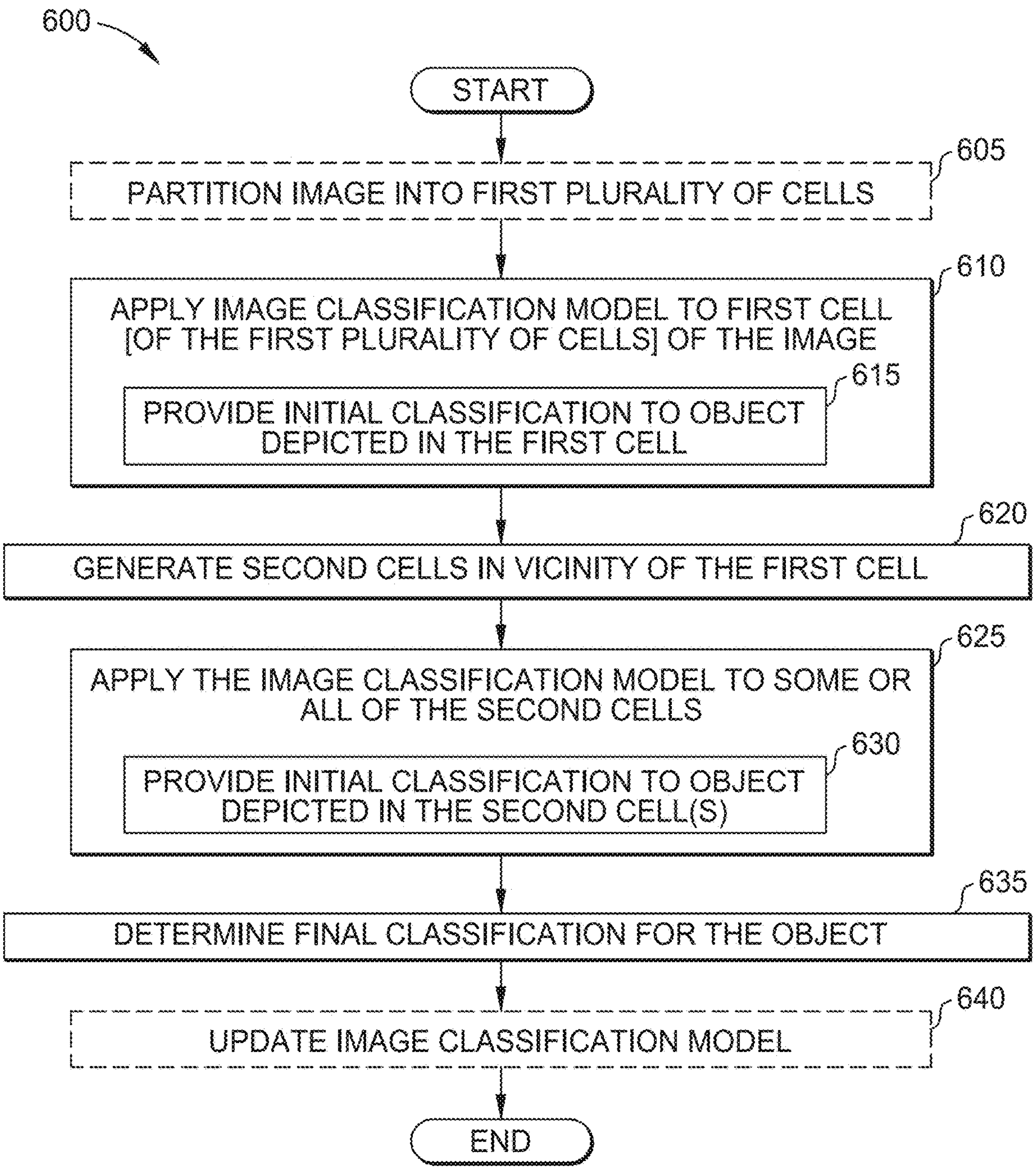
FIG. 6 is an example method of detecting an incorrect classification, according to one or more aspects.

Turn ahead to FIG. 6, which is an example method 600 of detecting an incorrect classification, according to one or more aspects. The method 600 may be performed in conjunction with other aspects, e.g., performed using the image segmentation service 130 and the image classification model 125 of FIG. 1. In some aspects, the image segmentation service 130 performs the method 600 responsive to a positive classification of an image, and effectively determines whether the positive classification was determined based on one or a few isolated cells within the image. In some alternate aspects, the image segmentation service 130 performs the method 600 responsive to a positive classification of an image having a low confidence. In some alternate aspects, the image segmentation service 130 performs the method 600 responsive to determining that only a few adjacent cells of a first plurality of cells (e.g., determined in optional block 605) also have positive classifications (or, more generally, that adjacent cells in the first plurality of cells have a same classification that differs from that of the image).

Figure 5A:
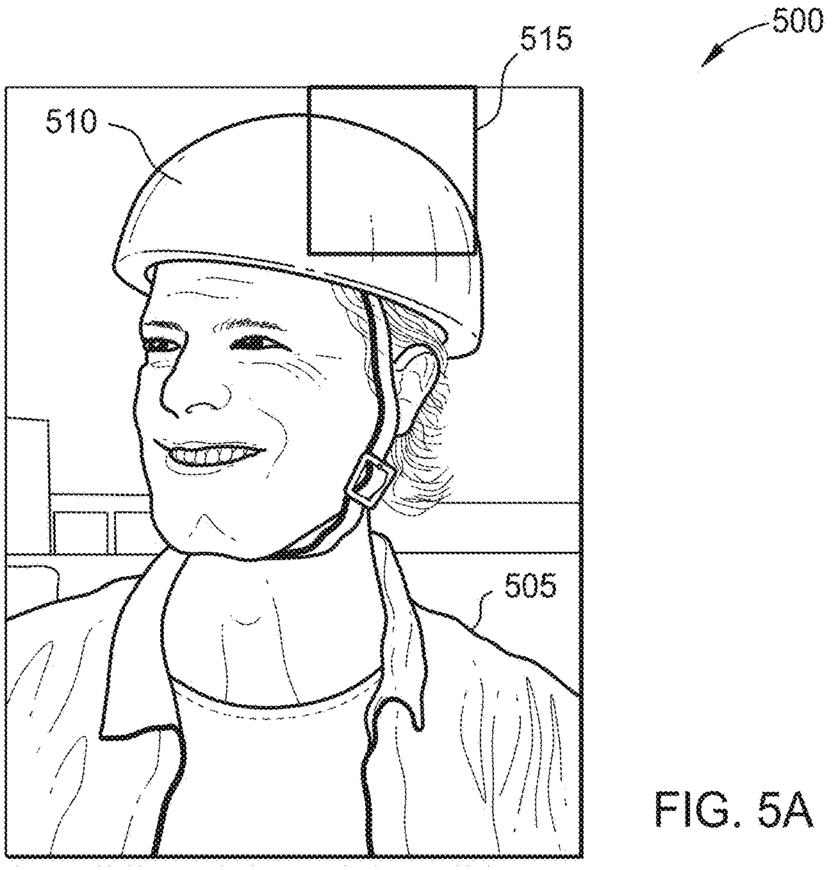
FIGS. 5A, 5B depict an example sequence of detecting an incorrect classification, according to one or more aspects.
Figure 5B:
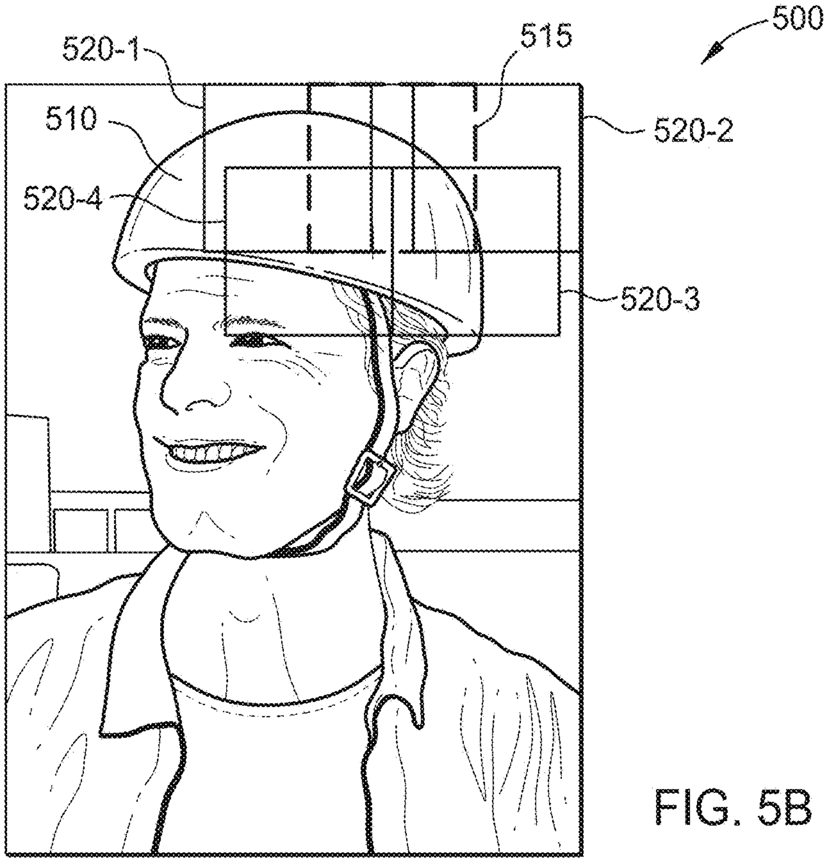

The method 600 will now be described with reference to FIGS. 5A and 5B, which depict an example sequence of detecting an incorrect classification, according to one or more aspects. FIGS. 5A and 5B include an image 500 that depicts the upper body of a man 505 who is wearing a helmet 510. The method 600 begins at optional block 605, where the image segmentation service 130 partitions the image 500 into a first plurality of cells. The optional block 605 may be similar to block 415, discussed above.

At block 610, the image segmentation service 130 applies the image classification model 125 to a first cell 515 of the image 500. In some aspects, the first cell 515 is included in the first plurality of cells, partitioned at the optional block 605. The block 610 may be similar to block 420, discussed above.

At block 615, applying the image classification model 125 to the first cell 515 comprises providing an initial classification to an object depicted in the first cell 515. In the example depicted in FIG. 5A, the initial classification of the object may be a bowling ball, possibly due to its spherical shape, color, openings, etc. As discussed above, this initial classification may be considered a false positive having a relatively high confidence value.

At block 620, the image segmentation service 130 generates one or more second cells 520-1, 520-2, 520-3, 520-4 in vicinity of the first cell 515. The block 620 may be similar to block 435, discussed above. Although four (4) second cells 520-1, 520-2, 520-3, 520-4 are shown, other numbers of second cells are also contemplated. Further, the second cells 520-1, 520-2, 520-3, 520-4 as shown are also a same size as the first cell 515, and are partly overlapping with the first cell 515. The second cells 520-3, 520-4 are arranged one stride length away from the midpoint of the first cell 515 (similar to FIG. 2B), but the second cells 520-1, 520-2 are arranged at a same vertical position as the first cell 515 due to their proximity to a top edge of the image 500. Other sizes and/or arrangements of the second cells 520-1, 520-2, 520-3, 520-4 are also contemplated.

At block 625, the image segmentation service 130 applies the image classification model 125 to some or all of the second cells 520-1, 520-2, 520-3, 520-4. The block 625 may be similar to block 440, discussed above. In some aspects, applying the image classification model 125 comprises providing an initial classification to an object depicted in the second cells 520-1, 520-2, 520-3, 520-4. In the example depicted in FIG. 5B, the initial classification for the second cell 520-1 may be a bowling ball, for the second cells 520-3, 520-4 may be a helmet, and for the second cell 520-2 may be unknown.

At block 635, the image segmentation service 130 determines a final classification for the object. Determining the final classification may be performed according to any suitable techniques, such as selecting the classification for a particular cell that has a maximum confidence, majority voting among the classifications of the first cell 515 and the second cells 520-1, 520-2, 520-3, 520-4, weighted voting, and so forth.

At optional block 640, the image segmentation service 130 updates the classification of the image based on the final classification (e.g., in cases where the final classification differs from the initial classifications of the first cell 515 and the second cells 520-1, 520-2). For example, the image segmentation service 130 may update the classification of the image from "this image contains no positives" to "this image contains one or more positives" based on the final classification. The classification of the image may be used to determine whether the image is flagged for review. The method 600 ends following completion of the optional block 640.

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method of performing image segmentation on an image, the method comprising:

partitioning the image into a first plurality of cells;

applying an image classification model to some or all of the first plurality of cells to identify a first set of one or more cells that depict an object, wherein the object is provided a first classification by the image classification model;

generating, for at least one cell of the first set, a respective second plurality of cells that are in a vicinity of the cell;

applying the image classification model to some or all of the respective second plurality of cells to identify a second set of one or more cells that depict the object; and generating, using the cells of the first set and the second set that depict the object, a border around the object.

2. The method of claim 1, wherein the first plurality of cells are non-overlapping with each other.

3. The method of claim 1, wherein for at least one cell of the one or more cells, some or all of the respective second plurality of cells partly overlap with the cell.

4. The method of claim 1, wherein for at least one cell of the second set, the object is provided a second classification by the image classification model.

5. The method of claim 4, further comprising:

determining a final classification for the object based on respective confidence levels for classifications of the cells of the first set and the second set, wherein generating the border around the object is responsive to determining the final classification.

6. The method of claim 1, wherein a cell size of the respective second plurality of cells is smaller than a cell size of the one or more cells.

7. The method of claim 1, wherein partitioning the image is responsive to applying the image classification model to the image.

8. The method of claim 1, wherein generating the border around the object is responsive to one of:

determining an intersection of the cells of the first set and the second set, and determining midpoints of the cells of the first set and the second set.

9. A computer program product comprising:

a computer-readable storage medium having computer-readable program code embodied therewith, the computer-readable program code executable by one or more computer processors to perform an operation of image segmentation on an image, the operation comprising:

partitioning the image into a first plurality of cells;

applying an image classification model to some or all of the first plurality of cells to identify a first set of one or more cells that depict an object, wherein the object is provided a first classification by the image classification model;

generating, for at least one cell of the first set, a respective second plurality of cells that are in a vicinity of the cell;

applying the image classification model to some or all of the respective second plurality of cells to identify a second set of one or more cells that depict the object; and generating, using the cells of the first set and the second set that depict the object, a border around the object.

10. The computer program product of claim 9, wherein the first plurality of cells are non-overlapping with each other.

11. The computer program product of claim 9, wherein for at least one cell of the one or more cells, some or all of the respective second plurality of cells partly overlap with the cell.

12. The computer program product of claim 9, wherein for at least one cell of the second set, the object is provided a second classification by the image classification model.

13. The computer program product of claim 12, the operation further comprising:

determining a final classification for the object based on respective confidence levels for classifications of the cells of the first set and the second set, wherein generating the border around the object is responsive to determining the final classification.

14. The computer program product of claim 9, wherein a cell size of the respective second plurality of cells is smaller than a cell size of the one or more cells.

15. The computer program product of claim 9, wherein partitioning the image is responsive to applying the image classification model to the image.

16. The computer program product of claim 9, wherein generating the border around the object is responsive to one of:

determining an intersection of the cells of the first set and the second set, and determining midpoints of the cells of the first set and the second set.

17. A system comprising:

a memory storing an image classification model; and one or more processors configured to perform an operation of image segmentation on an image, the operation comprising:

partitioning the image into a first plurality of cells;

applying an image classification model to some or all of the first plurality of cells to identify a first set of one or more cells that depict an object, wherein the object is provided a first classification by the image classification model;

generating, for at least one cell of the first set, a respective second plurality of cells that are in a vicinity of the cell;

applying the image classification model to some or all of the respective second plurality of cells to identify a second set of one or more cells that depict the object; and generating, using the cells of the first set and the second set that depict the object, a border around the object.

18. The system of claim 17, wherein for at least one cell of the second set, the object is provided a second classification by the image classification model, the operation further comprising:

determining a final classification for the object based on respective confidence levels for classifications of the cells of the first set and the second set, wherein generating the border around the object is responsive to determining the final classification.

19. The system of claim 17, wherein a cell size of the respective second plurality of cells is smaller than a cell size of the one or more cells.

20. The system of claim 17, wherein generating the border around the object is responsive to one of:

determining an intersection of the cells of the first set and the second set, and determining midpoints of the cells of the first set and the second set.

* * * * *